United States Patent [19]
Kovach

[11] 3,720,043
[45] March 13, 1973

[54] METHOD FOR HIGH EFFICIENCY FILTERING SYSTEM

[75] Inventor: Julius Louis Kovach, Columbus, Ohio

[73] Assignee: North American Carbon, Incorporated, Columbus, Ohio

[22] Filed: June 22, 1970

[21] Appl. No.: 47,941

[52] U.S. Cl. ................................................. 55/74
[51] Int. Cl. ............................................. B01d 53/04
[58] Field of Search .............. 55/74, 387; 176/19, 37

[56] References Cited

UNITED STATES PATENTS

| | | | |
|---|---|---|---|
| 3,217,471 | 11/1965 | Silverman | 55/387 |
| 3,240,555 | 3/1966 | Nash | 55/74 |
| 3,429,103 | 2/1969 | Taylor | 55/74 |
| 3,405,508 | 10/1968 | Peters et al. | 55/73 |
| 3,479,146 | 11/1969 | Hochman et al. | 55/387 |
| 3,503,184 | 3/1970 | Knapp et al. | 55/71 |

*Primary Examiner*—Charles N. Hart
*Attorney*—Cennamo, Dunbar and Kremblas

[57] ABSTRACT

A method for high efficiency filtration of both gaseous and particulate radioactive contaminants characterized by a single pass of an air stream carrying the contaminants through a single bed of granular materials and then venting the filtered stream to the surrounding environment. The granular bed is characterized by a given minimum depth of adsorbent particles of a given minimum size range which preferably is calculated on a basis dependent upon a given minimum removal efficiency of radioactive gaseous and particulate matter.

4 Claims, 3 Drawing Figures

PATENTED MAR 13 1973

INVENTOR.
LOUIS J. KOVACH

BY
Cennamo, Dunbar & Kremblas
ATTORNEYS 1. 4 × 6 MESH PELLETED CARBON
2. 4 × 6 MESH COCONUT CARBON
3. 6 × 12  "          "          "
4. 8 × 16  "          "          "
5. 12 × 20 "          "          "
6. 12 × 30 "          "          "

METHOD FOR HIGH EFFICIENCY FILTERING SYSTEM

The present invention relates generally to filtering systems and particularly to a novel filtering system and process adapted for high efficiency filtering of both particulate and gaseous contaminants of a dangerous nature.

In nuclear reactors for example, an important feature of the design is to provide for a high degree of safety against potential release of radioactive contaminants to the surrounding atmosphere. During operation of the reactor, fission products build up in the fuel elements. Under normal operating conditions, these fission products are retained within the cladding until the heat-producing efficiency is spent. Then these products are removed from the reactor and the reactor site with the spent fuel elements. The fuel elements are located in a pressure vessel or nuclear reactor. The reactor and certain heat transfer equipments are located within a containment system. Therefore three barriers are established between the radioactivity of the fissile fuel and the fission products and the surrounding environment; namely, the cladding of the fuel elements, the nuclear reactor pressure vessel, and the containment system. The containment system is the last barrier and its protective action must be maintained should a failure occur in the other barriers.

Conventional filter systems for combined filtration of both particulate and gaseous contaminants presently used in connection with nuclear reactors have generally consisted of a prefilter for large particulate matter, a mist separator to remove water droplets from the air stream, a conventional high efficiency particulate air filter for smaller particulate matter, referred to in the art as HEPA, a conventional shallow bed carbon filter, and lastly another HEPA filter. These filter systems are built up in banks from standard size units, for example, one HEPA filter for each 1000 cubic feet of air per minute and are generally disposed in tiers in the containment structure.

Each of these standard systems are associated with a large amount of hardware, such as for example, holding frames, moisture separators, gasketing surrounding each frame of each standard filter unit, and generally cooling coils to remove heat and reduce pressure.

In large installations, prior to the present invention, these systems have been of the recirculating type wherein the air is recirculated through the system until sufficient removal of radioactive materials from the containment system is accomplished. Once through systems have been devised but have been used only on small nuclear reactors. Their use for large power reactors was not feasible because of the danger of release of much larger quantities of radioactive materials and the insufficient reliability of conventional filter systems. This unreliability is inherent in the construction of these systems wherein for example, the particulate filters and moisture separators with glass fiber media are relatively fragile and also are subject to structural weakening with age.

Further, these conventional filter arrangements possess other disadvantages relating to the type of accidents which may occur to release radioactive gaseous and particulate matter into the containment system.

For example, in a loss of coolant type accident in which the secondary barrier fails, the primary barrier may also fail due to overheating which results in the release of fission products into the containment atmosphere. In water cooled reactors, large quantities of steam and water droplets would be released into the containment system in addition to other gaseous and particulate matter. Therefore there is a potential for possible moisture clogging of the HEPA filters which lowers their efficiency and possible flooding of the shallow carbon bed filters if there is a failure in the moisture separators located upstream in the flow pattern.

Another type of accident which may occur is referred to in the art as a "design basis accident" wherein a failure occurs in the primary system. This type of failure is characterized by a release of radioactive gaseous and particulate matter into the containment system and is associated with both a rapid temperature and pressure increase in the containment structure. In pressurized water and boiling water type reactors, cooling coils, cooling sprays, or suppression pools are employed to reduce temperature and pressure. However, the use of this type of equipment still requires very expensive and complicated containment apparatus to withstand the initial pressure and temperature rise.

In general the present invention incorporates a single bed of granular adsorbent material several times the depth employed in conventional adsorbent filters which functions to remove both gaseous and particulate matter from the incoming air stream. Relatively large particle sizes are used to form the bed compared to the small particle sizes used in prior conventional adsorbent beds. The bed is contained in a vessel of simple construction and preferably is horizontally disposed therein and designed for downflow of the incoming air stream through the bed.

Preferably, the bed includes a layer of adsorbent particles of a given size range and a given minimum depth to assure sufficient removal of radioactive gaseous and particulate matter. However, other non-adsorbent filter media particles can be incorporated in conjunction with the adsorbent material either in separate layers or in admixture with the adsorbent particles to assure sufficient removal of particulate as well as gaseous materials. The specific design of the bed can vary within predetermined ranges depending upon the particular circumstances of each application and the efficiency level desired with respect to both gaseous and particulate removal.

It is therefore a primary object of the present invention to provide a process for high efficiency filter systems which increases both gaseous and particulate removal efficiency while simplifying the construction of such systems relative to prior methods and means.

It is another object of the present invention to provide a process of the type described which has improved characteristics relative to withstanding pressure shocks, avoiding flooding and overheating.

It is still another object of the present invention to provide a process of the type described which can be regenerated while in place in a relatively short time and in a simple manner thereby eliminating costly and time consuming replacement of filter apparatus and media.

It is a further object of the present invention to provide a process of the type described which permits the incorporation of other filter media layered in a single bed form to substantially increase the removal efficiency of particulate matter over a wide particle size range including the Aitken nuclei size range.

IN THE DRAWINGS

Figure 1:
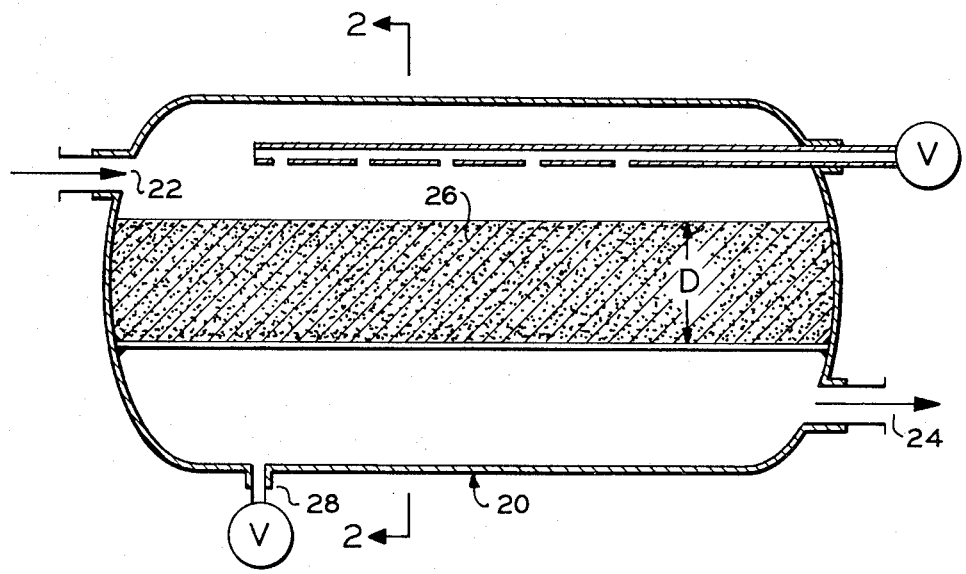
FIG. 1 is a side elevational view in section and partially schematic of a filter apparatus constructed in accordance with the present invention, the section being taken along the centerline of the apparatus.
Figure 2:
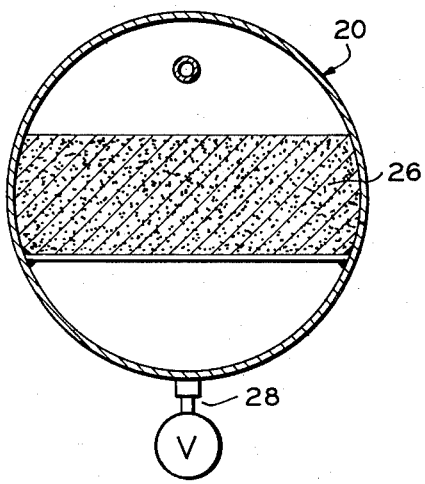
Fig. 2 is an end elevational view in section of the apparatus shown in FIG. 1.

Referring in detail to the drawings, a combined particulate nd gaseous filter apparatus constructed in accordance with the present invention is illustrated in FIG. 1 and includes a housing or holding vessel, indicated generally at 20. Vessel 20 includes an inlet 22 for the incoming contaminant-laden gas stream and an outlet 24 for the exiting filtered stream.

A conventional blower system, not shown, is communicated to inlet 22 to provide a source of air that would carry the gaseous and particulate contaminants through the system. Further, the entering stream should be dispersed for substantially uniform distribution to bed 26. There are many well-known, conventional techniques to accomplish such uniform distribution of gaseous streams, such as baffles or the like, which would be suitable for the purposes of the present invention and therefore are not shown or described in detail herein.

Bed 26 preferably comprises adsorbent materials; such as carbon, aluminas, or zeolites for example, and is horizontally supported between the opposing inner walls of vessel 20 by a suitable supporting means. A simple, durable means to support bed 26 is represented by a grating 28 fixed to the side walls of vessel 20 in any suitable conventional manner. A conventional cloth netting or wire mesh screen having openings smaller than the smallest particles comprising the bed is laid over the grating 28 to prevent the loss of the individual adsorbent particles and yet permit the passage of liquids and gases.

It is important to point out that the adsorbent particles of bed 26 must be relatively carefully distributed to ensure that a closely packed relationship exists between the inner walls of vessel 20 and the particles comprising the bed. This in effect prevents leakage of the incoming air stream around the bed and the possible release of contaminants through outlet 24. It is also important to note that this type of bed design is far superior to the prior art type wherein a plurality of standard size units are placed side by side and gasketing is required around the individual frames of each standard unit. Such gasketing requirements are not desirable because of the inherent potential and actual leakage problems encountered wherein unfiltered portions of the air stream circumvent the filtering media through faults occuring in the gasketing.

Vessel 20 also includes a liquid drain 28 disposed in the bottom of the vessel to provide for removal of any water or other condensed liquid which may accumulate. An inert gas or steam line is provided with suitable orifices is provided to permit the bed to be regenerated periodically which eliminates the necessity for frequent and costly replacement of filter media which is required using conventional apparatus and techniques.

Referring now to the specific embodiment shown, the depth of bed 26 and the particle size of the adsorbent particles making up the bed are primary considerations of the present invention and are dependent to a degree upon one another.

For a clearer understanding of the present invention, it should be noted that prior high efficiency type filter systems for combined gaseous and particulate matter have used a series or train of separate filter media as pointed out previously herein. The adsorbent filter bed used in those trains consisted of a shallow bed of fine adsorbent particles. It is well-known that the efficiency of removal of gaseous and particulate matter per inch of bed depth increases with decreasing particle size of bed material. This has been the approach taken in the prior art filter systems; that is, a shallow bed of filter media consisting of relatively small particle sizes. Therefore, to obtain high efficiency of removal of gaseous contaminants at pressures which will not rupture the relatively fragile HEPA filters located upstream, the depth of the bed used has been limited to about 2 inches and the maximum particle size of the adsorbent has been limited to 8 × 16 mesh.

However, a novel and completely different approach is employed in the present invention wherein the bed depth is substantially increased and also the size of the particles in the bed are increased. In effect, the overall efficiency of contaminant removal is maintained and in fact increased by appropriate design. However, the surprising results of such an approach occurs in the elimination or substantial decrease or many of the problems and hazards encountered using prior art systems in addition to decreasing both installation and maintenance costs.

For example, one of the problems encountered in conventional high efficiency filter systems used in nuclear power facilities is the loss of efficiency of the carbon filter beds due to the rise in temperature caused by the decay heat of deposited radioactive iodine forms. As the temperature rises significantly, the iodine forms tend to migrate through the bed and may escape to the surrounding environment.

This problem is substantially reduced if not completely eliminated using the method and apparatus of the present invention because the larger particle sizes employed in the bed maintain a lower removal efficiency per inch of bed depth and this distribute the fission products and the decay heat produced therefrom in a wider band. Therefore the temperature rise of the bed is not as great and migration is less likely to occur. If some migration does occur, the depth of the bed is great enough to prevent the iodine forms from passing through the bed. In conjunction with this same problem, the fire hazard is significantly lowered using the method and apparatus of the present invention for the same reason, namely, narrow band or spot overheating caused by decay heat of deposited radioactive forms is essentially eliminated.

Narrow band or spot heating is caused in the conventional type beds because the particles sizes employed are small and the adsorption of fission products is concentrated in a very narrow band of fractions of an inch at the entry face of the bed and this permits the decay heat to be concentrated at potentially dangerous levels.

For example, tests relating to iodine removal efficiencies show that with an air velocity of 100 feet per minute and carbon granules of eight by 16 mesh particle size, 99.99 percent of the radioactive elemental iodine removed was concentrated in the first one-half inch of the bed. However, using carbon particles of four by 6 mesh, for example, this same percent is distributed over approximately the first seven inches of the bed.

Another problem which is solved by the present invention is that of flooding of the carbon bed, which results from the retention of condensed water in the interstices between the particles. This represents a substantial hazard in conventional systems if a failure occurs in the moisture separators placed ahead of the carbon filters. However, this danger is avoided in the present invention since the larger particle sizes used permits much higher gas velocities to be employed through the system, which in conjunction with the greater inter-particle volume, eliminates the potential of flooding the bed. Condensed water vapor flows through the enlarged interstitial conduits formed between the particles in the bed to the bottom of the vessel for simple removal through drain outlet 28, for example.

More specifically, suitable particle sizes for the bed which work well in the filtering system of the present invention have been found to be in the range of approximately 12 mesh to one quarter inch mesh as specified in ASTM Standard E-11. Beds employing any substantial proportion of adsorbent particles having a size smaller than 12 mesh give rise to the problems encountered in the prior art systems, such as narrow band overheating, potential flooding, and the requirement of much lower gas stream velocities. As the particle size becomes much larger than one quarter inch mesh, the bed depth required increases to a point which becomes impractical for most applications.

The depth of the bed is a function of the specific requirements of the system such as for example, the potential loading of contaminants per cubic foot of air, and the particle size and shape of the granular filter media employed. The minimum depth of at least the adsorbent material included in the bed is approximately six inches for most conditions in systems in which radioactive contaminants are encountered. However, the preferred depth for meeting most safety factors required under most present applications is approximately twelve inches or more. The maximum depth of the bed is only limited by practical sufficient efficiency in contaminant removal.

As one approaches the minimum six inch depth, the particle size employed must approach the lower limit of the size range, that is approximately 12 mesh. For the purposes of the present invention the minimum particle size range employed should be no smaller than 8 × 12 mesh in a bed approaching the minimum depth of 6 inches. However, as the depth of the adsorbent particles in the bed increases, proportionately larger particle sizes are preferred.

A typical example of a preferred design constructed in accordance with the present invention and meeting present government standards for a nuclear reactor application would be illustrated by following system conditions:

| | |
|---|---|
| Air Flow: | 10,000 SCFM |
| Vessel, I.D.: | 5.0 ft. |
| Vessel, length: | 12.0 ft. |
| Air Velocity: | 166 fpm. |
| Carbon type: | 4×6 mesh (4mm. pellets) |
| Carbon bed depth: | 15 inch |
| Pressure drop: | 10 inch w.g. |

It is important to point out that the bed may be constructed in graded layers of adsorbent particles within the range noted above and may also include layers of other non-adsorbent granular filter media such as sand, crushed gravel and the like which can be incorporated to enhance the particulate filtering efficiency of the system at less cost.

However, the use of other non-adsorbent materials is not required for particulate removal as test have shown that granular adsorbent particles work very well and function to remove both gaseous and particulate matter and therefore are the preferred form of bed material. Again, however, the small particle size employed in conventional carbon beds cannot be used to any substantial degree without prefiltering because of the tendency of particulates and condensate to fill the interstitial volume and restrict the air flow or prevent passage of the air stream completely.

It should also be noted that, if desired, various types of adsorbent materials can be layered or mixed to form the total adsorbent bed depth required such as for example, combining alumina and carbon in a single bed.

The gas stream velocity is substantially increased in the method of the present invention. It has been found that in filter beds constructed in accordance with the present invention, increased gas stream velocity increases particulate fission product removal efficiency without detriment to gaseous fission product removal efficiency. Therefore, in addition to reducing the potential of flooding of the adsorbent filter media, increasing the gas stream velocity substantially over the velocity used in prior methods increases the efficiency of particulate removal. Conventional systems use air stream velocities in the range of 40 to 70 feet per minute whereas the apparatus of the present invention permits the filtering process to operate with air stream velocities as high as 250 feet per minute. The upper limit of air stream velocity is determined primarily by considerations of pressure drop across the bed. Too large a pressure drop is not desirable, however a pressure drop in the range of 8 to 12 inches w.g. across the bed is quite suitable for most applications and can be maintained quite easily using the teachings of the present invention.

Figure 3:
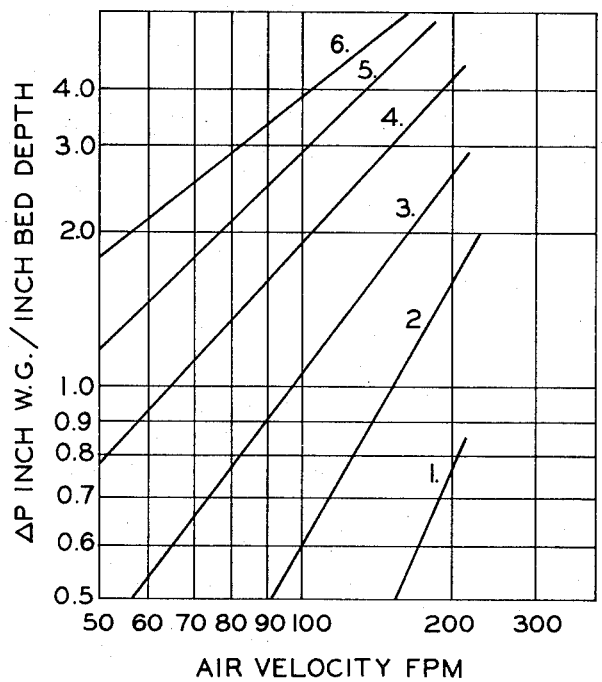
FIG. 3 is a graphic illustration of test results obtained under specified conditions employing the principles of the present invention.

Referring specifically to FIG. 3, test data is graphically illustrated and plotted on a logarithmic scale. The pressure drop in inches of water at standard gravity per inch of bed depth is plotted versus the air velocity of the entering air stream in feet per minute. Tests were conducted using beds of the same depth but employing carbon granules of different particle size or as illustrated by lines 1 and 2 different shapes of the same particle size.

It is readily seen that at an entering air velocity of about 70 feet per minute the pressure drop per inch of bed depth for a bed comprising particles having a size of 8×16 mesh or smaller is significantly greater than 1 inch of water at standard gravity.

A bed constructed in accordance with the present invention exhibits a resistance to air flow of less than one inch w.g. per inch of bed depth at an entering air stream velocity of approximately 70 feet per second. However, a pressure drop of less than 0.7 inches w.g. per inch of bed depth at the same entering air stream velocity is preferred fro conditions encountered presently in the field of application.

Therefore, in accordance with the present invention the depth of the bed may be increased several times over the depth of conventional adsorbent beds without encountering potentially troublesome pressure drops across the bed at entering air stream velocities considerably higher than possible using prior methods and means. This, of course, leads to some of the advantages of the present invention previously noted herein.

It should be readily apparent from the foregoing description that the apparatus and method of the present invention eliminates or substantially reduces most of the disadvantages of prior art systems and techniques, increases the potential efficiency of such systems, provides a much simpler, safer, more durable and less expensive construction, and further requires less maintenance as compared to prior systems.

I claim:

1. A process for decontamination of a gaseous stream carrying radioactive contaminants comprising the steps of causing said gaseous stream to pass through a bed of adsorbent particles, the depth of said bed being at least approximately six inches or greater and the particle size range of said adsorbent particles being at least 8 × 12 mesh or greater as specified in ASTM Standard E-11, as the depth of said bed is increased above 6 inches, the particle size of the adsorbent particles comprising said bed is increased above above said 8 × 12 mesh, and wherein the pressure drop across said bed is less than one inch w.g. per inch depth of bed when based upon an entering gas stream velocity of at least approximately 70 feet per minute; and subsequently venting said filtered stream to the surrounding environment.

2. The process defined in claim 1 wherein said adsorbent particles are activated carbon having a size range of at least 6 × 12 mesh as specified in ASTM Standard E-11 and the depth of said bed is at least 7 inches.

3. The process defined in claim 1 wherein the depth of said bed of adsorbent particles is at least 8 inches and the particle size of said particles is at least 4 × 6 mesh or greater as specified in ASTM Standard E-11.

4. The process defined in claim 1 wherein the entering velocity of said gaseous stream carrying said radioactive contaminants is maintained in a range between 70 feet per minute and 200 feet per minute in accordance with a particle size range of the adsorbent particles comprising the bed to maintain a pressure drop across said bed of less than one inch w.g. per inch of bed depth.

* * * * *